United States Patent
Gonzalez-Mendoza et al.

(10) Patent No.: US 9,405,279 B2
(45) Date of Patent: Aug. 2, 2016

(54) METHOD AND SYSTEM FOR CONTROLLER TRANSITION

(71) Applicants: Dagoberto Gonzalez-Mendoza, Oslo (NO); Arnt Olav Sveen, Eina (NO)

(72) Inventors: Dagoberto Gonzalez-Mendoza, Oslo (NO); Arnt Olav Sveen, Eina (NO)

(73) Assignee: Siemens Aktiengesellschaft, München (DE)

( * ) Notice: Subject to any disclaimer, the term of this patent is extended or adjusted under 35 U.S.C. 154(b) by 135 days.

(21) Appl. No.: 14/385,459

(22) PCT Filed: Jan. 28, 2013

(86) PCT No.: PCT/EP2013/051531
§ 371 (c)(1),
(2) Date: Sep. 15, 2014

(87) PCT Pub. No.: WO2013/135412
PCT Pub. Date: Sep. 19, 2013

(65) Prior Publication Data
US 2015/0073570 A1    Mar. 12, 2015

(30) Foreign Application Priority Data

Mar. 16, 2012 (EP) .................................... 12159803

(51) Int. Cl.
*G05B 9/03* (2006.01)
*G05B 19/042* (2006.01)
*G05B 19/05* (2006.01)

(52) U.S. Cl.
CPC .............. *G05B 9/03* (2013.01); *G05B 19/0428* (2013.01); *G05B 19/054* (2013.01); *G05B 2219/14014* (2013.01); *G05B 2219/25471* (2013.01)

(58) Field of Classification Search
CPC .... G05B 9/03; G05B 19/054; G05B 19/0428; G05B 2219/14014; G05B 2219/25471; G05B 9/02; G05B 19/048; G05B 19/0425; G05B 19/058
See application file for complete search history.

(56) References Cited

U.S. PATENT DOCUMENTS

| 6,845,467 B1* | 1/2005 | Ditner ................ G05B 19/0428 714/10 |
| 2005/0240812 A1* | 10/2005 | Anderson ........... G06F 11/2017 714/11 |

(Continued)

FOREIGN PATENT DOCUMENTS

| EP | 02404645 A2 | 1/2012 |
| EP | 2404645 A3 | 6/2013 |

(Continued)

OTHER PUBLICATIONS

PCT Preliminary Report on Patentability dated Mar. 21, 2014 for corresponding PCT/EP2013/051531.

(Continued)

*Primary Examiner* — Mohammad Ali
*Assistant Examiner* — Nathan L Laughlin
(74) *Attorney, Agent, or Firm* — Lempia Summerfield Katz LLC

(57) ABSTRACT

A method for transition of control from a first controller to a second controller includes communicatively coupling the first controller and the second controller, such that at least one input signal received by one controller is mutually provided to the other controller and such that at least one output signal generated by one controller is mutually provided to the respective other controller. The method includes disconnecting at least one output line from the first controller, connecting the at least one output line to the second controller, and supplying an output signal to the at least one output line. The method includes, before disconnecting at least one output line from the first controller, supplying a logical high signal to the output line by an external voltage source if the first output signal is a logical high signal or if the output line is at a logical high state during normal operation.

17 Claims, 1 Drawing Sheet

(56) References Cited

U.S. PATENT DOCUMENTS

| | | | |
|---|---|---|---|
| 2009/0089774 A1* | 4/2009 | Lynch | G06F 8/67 717/173 |
| 2010/0030937 A1 | 2/2010 | Schuermann et al. | |
| 2013/0079902 A1* | 3/2013 | Kamenetz | G05B 19/0421 700/82 |
| 2013/0218306 A1 | 8/2013 | Polzer | |

FOREIGN PATENT DOCUMENTS

| | | |
|---|---|---|
| JP | S58103003 A | 6/1983 |
| JP | 2000305601 A | 11/2000 |
| JP | 2001337706 A | 12/2001 |
| JP | 2008021264 A | 1/2008 |
| JP | 2012000468 A | 1/2012 |
| JP | 2012034189 A | 2/2012 |
| WO | WO2011110649 A1 | 9/2011 |

OTHER PUBLICATIONS

PCT International Search Report and Written Opinion of the International Searching Authority dated May 14, 2013 for corresponding PCT/EP2013/051531.

European Search Report dated Aug. 30, 2012 for corresponding EP 12 15 9803.

S. Draeger et al., "Austausch einer Steuerung gegen ein anderes Fabrikat bei laufendem Betrieb/Change-out of a control system to a new during plant operation," Automatisierungstechnische Praxis—ATP, Oldenburg Industrieverlag, München, DE, vol. 34, No. 11, pp. 637-639, 1992.

Japanese Grant of Patent for related Japanese Application No. 2014-561334, dated Dec. 7, 2015, with English Translation.

* cited by examiner

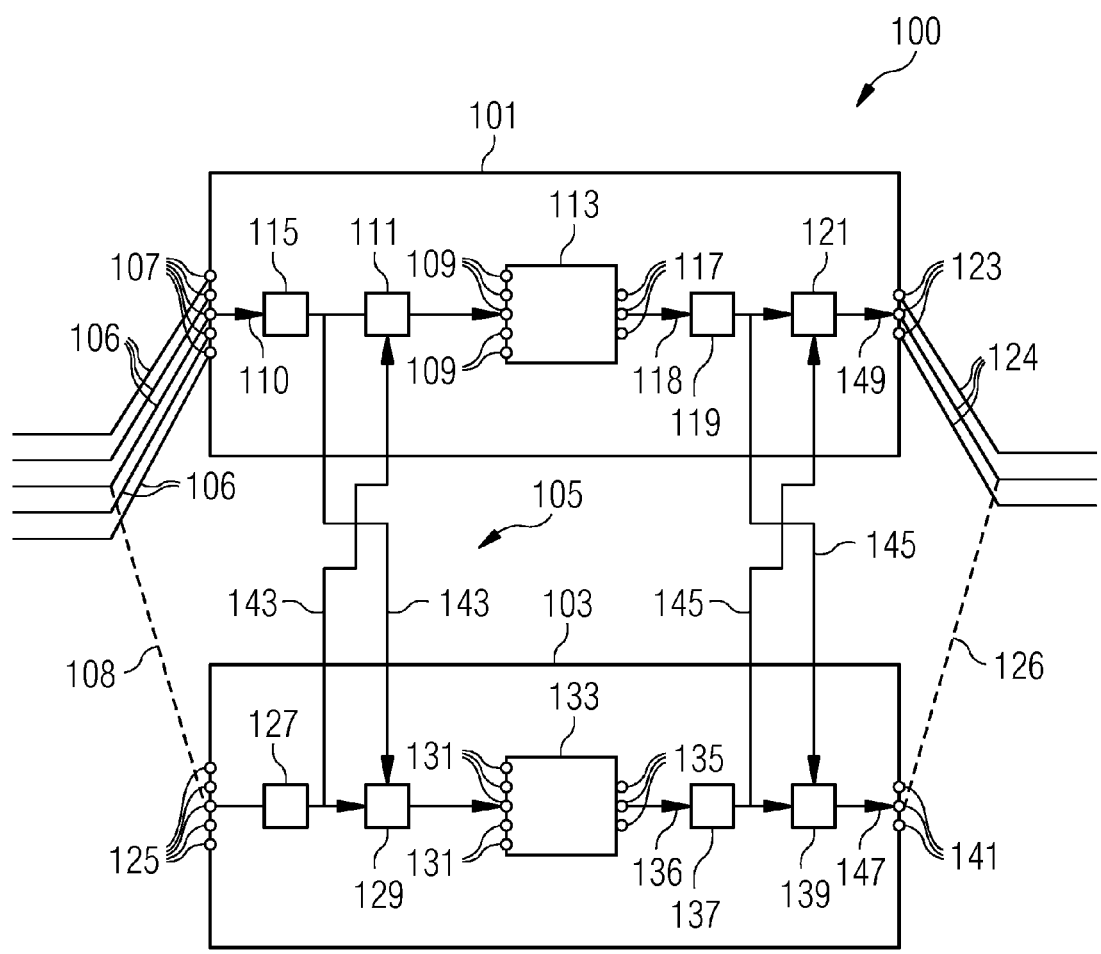

METHOD AND SYSTEM FOR CONTROLLER TRANSITION

This application is the National Stage of International Application No. PCT/EP2013/051531, filed Jan. 28, 2013, which claims the benefit of EP 12159803.1, filed Mar. 16, 2012. The entire contents of these documents are hereby incorporated herein by reference.

FIELD

The present embodiments relate to transition of control between two controllers.

BACKGROUND

For production of oil and/or gas (e.g., using an offshore oil or gas platform), equipment for taking measures in an emergency case, such as a fire emergency case or a gas release emergency case, may be provided. For example, one or more actuators (e.g., pumps) may be operated in order to fight the gas and/or fire emergency situation.

The emergency equipment may be controlled by a controller receiving one or more input signals, such as input signals derived from one or more sensors or derived from manual input of maintenance personnel.

From time to time, the controller(s) may be replaced by new controller(s). Plural input lines connected to each existing controller may thus be switched to plural corresponding input terminals of each new controller. Further, plural output lines currently connected to plural output terminals of the existing controller may be connected to plural output terminals of the new controller. During such a switching or transition between the existing controller and the new controller, proper operation of the emergency system is to be provided. For example, the emergency system may not be shut down since shutting down the emergency system may involve extensive costs. For example, during replacement of existing old control systems by new control systems (e.g., for process plants), it may be necessary to avoid production loss due to shutdown of controllers and due to loss of integrity of the control and safety system. It may also be necessary to avoid stress of central control room operator personnel to maintain focus and safety of the process planned.

In a conventional system, during replacement of existing process control systems with new process control systems, the system may be shut down.

There may be a need for a method and for a system for transition of control between two controllers, where shutdown of the control system during change over or transition from the existing old controller to the new controller may be prevented.

Further, there may be a need for such a method and a system, where disturbance of the control room personnel may be reduced. Further, there may be a need for such a method and system, where present equipment may be utilized without requiring expensive hardware changes or hardware changes at all.

SUMMARY AND DESCRIPTION

The scope of the present invention is defined solely by the appended claims and is not affected to any degree by the statements within this summary.

A method and a system for transition of control between two controllers may be provided, where shutdown of the control system during change over or transition from the existing old controller to the new controller may be prevented.

Disturbance of the control room personnel may be reduced. Present equipment may be utilized without requiring expensive hardware changes or hardware changes at all.

One or more of the present embodiments obviate at least some of the drawbacks of the prior art and provide transition of control from a first controller to a second controller, where shutdown of the control system during the transition is prevented.

According to one embodiment, a method for transition of control from a first controller to a second controller is provided. The method includes communicatively coupling the first controller and the second controller, such that at least one static digital input signal received by one controller is mutually provided to the respective other controller, and such that at least one static digital output signal generated by one controller is mutually provided to the respective other controller. The method also includes disconnecting at least one output line from the first controller, connecting the at least one output line to the second controller, and supplying at least one output signal to the at least one output line. The at least one output signal is obtained by performing a logical OR to at least one first output signal generated by the first controller and at least one second output signal generated by the second controller. The method for transition also includes, before disconnecting at least one output line from the first controller, supplying a logical high signal (e.g., a signal of 24 V) to the at least one output line by an external voltage source if the first output signal is a logical high signal or if the output line is at the logical high state during normal operation.

The method for transition of the control from the first controller to the second controller may include acts that are electronically performed and acts that are performed by physically moving or manipulating the output line(s) and/or the input line(s).

The first controller may also be referred to as the existing controller, and the second controller may also be referred to as the new controller that is intended to replace the existing controller. The first controller may include at least one (e.g., a plurality of) first input terminal(s) to which the at least one (e.g., a plurality of) first input line(s) may be connectable and may be connected at the beginning of the method. Analogously, the second controller may include a second input terminal(s) (e.g., a same number of input terminal(s)) to which the at least one input line(s) is connectable.

The input terminals of the first and the second controller may be adapted to receive, for example, digital logical static signals, such as a signal of, for example, 24 V indicating a logical high state or a signal of 0 V indicating a logical low state or vice versa. The digital input signal or input signals received at the plurality of respective input terminals may be static (e.g., may be constant over extended time spans), such as between one hour and three months (e.g., between one day and three months). For example, the input signals may only change in an emergency case, such as a gas emission or a fire situation.

Similarly, the first controller and also the second controller may include at least one (e.g., a plurality of) respective output terminal(s) that may be adapted to output static digital signal(s), such as a signal of 24 V indicating a digital or logical high state and a signal of 0 V representing a digital or logical low state.

The first controller and the second controller are communicatively coupled such that the input and output signal(s) of the first controller and the second controller (e.g., in combination referred to as the I/O status) are mutually exchanged or transferred in both directions. Thereby, an existing bus system may be utilized and software loaded into the first controller and the second controller may be utilized or may contribute to the mutual exchange. For example, communication between the existing (e.g., the first) and the new (e.g., the second) controller may be set-up via an existing network that may transfer the I/O status from the first controller to the second controller and vice versa.

The at least one output line may be connected to at least one first input terminal of the first controller. Then, the at least one output line may be physically disconnected (e.g., by a maintenance personnel such as a human being) from the at least one output terminal of the first controller. After the disconnecting of the output line from the first controller, the first controller may not be able to properly supply a control signal to a respective actuator connected at the other end of the output line. Therefore, during the time span between disconnecting the output line and connecting the output line to the second controller, a support voltage may be supplied by an external voltage source in order to maintain the proper controlling of the actuator connected to the other end of the output line.

During the changeover of the output line or input line, the control may be maintained at the first controller, receiving I/O signal as usual or via the communication bus that communicatively couples the first controller and the second controller. If the output line (and/or input line) has been moved (or connected) to the second controller, the output status is sent to the second controller, and the "OR"-gate performs an OR-operation with the output of the second controller. For example, the full status and control is available for the complete system except for the one signal line in transfer (e.g., the signal line, which is being disconnected from the first controller and is then connected to the second controller).

For example, the output signal and/or input signal that is in transfer (e.g., which is being disconnected from the first controller and then connected to the second controller) may be blocked/suppressed during the transfer, and the one signal and transfer may be verified in the second controller before being released from the second controller and used in an application program or used for controlling an actuator.

The method may be performed without temporary hardware changes except for eventual temporary bus connection hardware. Instead, communicatively coupling the first controller and the second controller may be achieved by loading a communication software into the first controller and the second controller and running this software, while the control system for controlling the emergency equipment is continuously in operation.

The at least one output signal is obtained by performing a logical OR on the first output signal generated by the first controller and the at least one second output signal generated by the second controller. Thus, if either the first output signal is high, or the second output is high or if the first output signal is high and the second output is low, or if the first output signal is low and the second output is high, the output signal supplied to the at least one output line is high.

When, for example, a plurality of output lines are to be connected, shifted, or switched from the first controller to the second controller, these output lines may be switched or moved from the first controller to the second controller one by one. The first output signal and/or the second output signal, for example, may thus be verified (e.g., by control personnel using a control screen) before the first output signal and/or the second output signal is actually released for transfer to the existing controller or the first controller. When it has been verified or checked that the second control signal generated by the second controller is valid blocking in, the second control signal may be removed. After all output lines and all input lines have been moved (e.g., connected to the second controller), and all blocks of all output signals and input signals have been removed at the second controller, the first controller may be removed without interrupting operation of the control system.

Thus, no shutdown of the emergency protection process may be required during change over or transition from the old existing process controller to the new process controller. The communication software to be used may be loaded and removed without any shutdown of the controller or the process. Thus, full integrity of the process controller function may be provided during changeover. For example, the method only includes or requires limited temporary hardware changes or even no hardware changes at all. Further, the control room operator may be disturbed only to a small extent. For example, activation of the I/O in changeover may be controlled by the local personnel during the changeover. For example, after complete changeover, the communication software for I/O status exchange may be removed from the first controller and also from the second controller.

By supplying a logical high signal (e.g., a signal of 24 V) to the at least one output line by an external voltage source, also during changeover of the at least one output line from the first controller to the second controller, an actuator connected to the other end of the output line may be properly operated when the output line is disconnected from the first controller and is also disconnected from the second controller. For example, supplying the logical high signal to the output line may not be required if the first output signal is a logical low value or signal, or if the output line is at a logical low level or low state during normal operation (e.g., in a non-emergency situation).

According to an embodiment, the method further includes (e.g., before the disconnecting of the at least one output line from the first controller) blocking output of the first output signal (e.g., using a blocking element included in the first controller arranged between an internal first output port of the first controller and a first output OR-gate in the first controller) and/or blocking output of the second output signal. Thereby, damage to the first controller and/or second controller may be avoided (e.g., when an external voltage source is connected to the at least one output line).

According to an embodiment, the method for transition of control further includes (e.g., after the connecting of the at least one output line to the second controller) removing blocking of the output of the second output signal and/or removing blocking of the output of the first output signal. Also, the external voltage source may be disconnected from the at least one output line upon or even slightly before the connecting of the at least one output line to the second controller. The actuator or application program connected to the other end of the output line may thus be properly supplied with the output signal, as generated by the first controller and/or the second controller.

According to an embodiment, the connecting of the at least one output line to the second controller includes connecting the at least one output line to at least one second output terminal of the second controller. The method also includes monitoring whether the connection of the at least one output line to the at least one second output terminal of the second controller is correct.

For example, whether the correct one of the at least one second output terminal has been connected with the at least one output line may be monitored. Therefore, for example, control personnel may check whether the connection is correct. Thereby, the method may be improved regarding safety and/or reliability.

According to an embodiment, connections of all output lines (e.g., 10-1000 output lines or between 100 and 500 output lines) of the at least one output line are switched one by one (e.g., such that only one of the output lines is disconnected from the first controller and then connected to the second controller while all other output lines are not touched during this transition time) from the first controller to the second controller. Proper connection of a switched output line may thus be monitored one by one.

According to an embodiment, the method further includes disconnecting at least one input line from the first controller, connecting the at least one input line to the second controller, and supplying the at least one input signal carried by the at least one input line to the first controller.

Thus, the method also enables transition of at least one input line (e.g., a plurality of input lines, such as between 10 and 1000 input lines) from the first controller to the second controller. For example, all input lines may be switched from the first controller to the second controller, and then, all output lines may be switched from the first controller to the second controller. Alternatively, all output lines may be switched from the first controller to the second controller, and then, all input lines may be switched from the first controller to the second controller. A subset of input lines may be switched from the first controller to the second controller, and then, a subset of output lines may be switched from the first controller to the second controller.

Although the at least one input line is not connected to the first controller anymore via the first input terminal of the first controller, the first controller is nevertheless supplied with the at least one input signal carried by the at least one input line by using the communication software that communicatively couples the first controller and the second controller. Thus, at any time of the performing of the method, the first controller as well as the second controller may have both the at least one input signal and the at least one output signal available except during the time span while the at least one input line is neither connected to the first controller nor connected to the second controller or when the at least one output line is neither connected to the first controller nor to the second controller.

According to an embodiment, the method for transition of control further includes (e.g., before the disconnecting of the at least one input line from the first controller) blocking the input signal at the first controller (e.g., such that the input signal supplied to the first input terminal of the first controller is not transferred to at least one first internal input port of the first controller), and/or blocking the input signal at the second controller (e.g., such that the input signal provided at the at least one second input terminal of the second controller is not supplied or transferred to a second internal input port of the second controller). Thereby, during the changeover of the at least one input line, damage to components of the controllers may be reduced or even avoided.

According to an embodiment, the method for transition of control further includes (e.g., after the connecting of the at least one input line to the second controller) removing the blocking of the input signal of the first controller and/or removing the blocking of the input signal of the second controller. Thus, the first controller and/or the second controller are then provided with the input signal delivered to the first input terminal of the first controller or delivered to the second input terminal of the second controller. The control function of the first controller and the second controller may thus be performed actually based on the real input signal.

The input signal may, for example, represent a sensor signal that senses gas emission or fire.

According to an embodiment, the connecting of the at least one input line to the second controller includes connecting the at least one input line to at least one second input terminal of the second controller. The method also includes monitoring whether the connection of the at least one input line to at least one second input terminal of the second controller is correct.

For example, the disconnecting of the at least one input line from the first controller may include disconnecting the at least one input line from at least one first input terminal. Further, whether the at least one first input terminal corresponds to the at least one second input terminal to which the input line has been connected may be checked. If it is determined that the connection of the at least one input line to the at least one second input terminal of the second controller does not correspond to the at least one first input terminal of the first controller, an alarm may be output. The at least one input line may also be disconnected from the faulty second input terminal and may instead be connected to another proper second input terminal of the second controller, which may be confirmed by another monitoring act.

Features individually or in any combination disclosed, described, explained or provided for a method for transition of control from a first controller to a second controller according to an embodiment may also be applied, provided or used for a system for transition of control between two controllers according to another embodiment and vice versa.

According to an embodiment, a system for transition of control between two controllers includes a first controller having at least one first input terminal, at least one first internal input port, and at least one first input OR-gate between the first input terminal and the first internal input port. The first controller also includes at least one first output terminal, and at least one first internal output port, at least one first output OR-gate between the first internal output port and the first output terminal. The system also includes a second controller having at least one second input terminal, at least one second internal input port, and at least one second input OR-gate between the second input terminal and the second internal input port. The second controller also includes at least one second output terminal, at least one second internal output port, and at least one second output OR-gate between the second internal output port and the second output terminal. The system includes a communication system for communicatively coupling the first controller and the second controller, such that an input signal received at a second input terminal of the second controller is supplied to the first input OR-gate. An output signal generated at a second output terminal of the second controller is supplied to the first output OR-gate. An input signal received at the first input terminal of the first controller is supplied to a second input OR-gate. An output signal generated at the first output terminal of the first controller is supplied to a second output OR-gate.

The first input terminal may represent a physical input terminal to which at least one input line may be connected. The first internal input port may represent a internal software logic within the first controller that may be indirectly connected to the first input terminal by providing the first input OR-gate in between. An I/O-card may be arranged between the first input terminal and the first internal input port. Further, a blocking element may be provided between the first input terminal and the first internal input port.

The first output terminal may represent a physical terminal to which at least one output line may be connected. The first internal output port may represent an internal internal software logic within the first controller at which the first controller generates a control signal based on the signal received at one or more of the at least one internal input port. In between the first output terminal and the first internal output port an I/O-card may be arranged. The I/O-card may provide data conversion or data encoding or decoding. The first controller may be adapted to be used in a method for transition of control from a first controller to a second controller according to an embodiment.

The first controller may therefore be adapted to exchange an I/O status of the first controller with the second controller.

The system according to this embodiment may be operating during replacement of the first controller by the second controller, while the system is in continuous operation.

According to an embodiment, the system for transition of control between two controllers further includes at least one first controllable input block arranged between the first input terminal and the first input OR-gate for blocking an input signal received at the first input terminal. The system also includes at least one first controllable output block arranged between the first internal output port and the first output OR-gate for blocking an output signal generated at the first internal output port, at least one second controllable input block arranged between the second input terminal and the second input OR-gate for blocking an input signal received at the second input terminal, and at least one second controllable output block arranged between the second internal output port and the second output OR-gate for blocking an output signal generated at the second internal output port.

The first controllable input block may avoid that an input signal supplied to the first input terminal may be transferred to the first internal input port for avoiding damage of the first controller. Further, the first controllable output block may avoid damage of the first controller when the output line is disconnected from the first controller or when a potential at the first output terminal is in an undefined condition. The same may apply to the second controllable input block and to the second controllable output block of the second controller.

Damage of the controller may thus be avoided, thus providing reliable operation of the system.

According to an embodiment, the communication system is implemented in software loaded into the first controller and the second controller. Thereby, no hardware replacements or additions may be used in order to provide the system and perform the method of transition of control.

According to an embodiment, the system for transition of control between two controllers is adapted as a protection system for controlling actuators for operation of a gas and/or fire emergency equipment.

For example, the gas and/or fire emergency equipment may be utilized for managing emergency cases in a gas exploration or gas and oil production facility, such as an offshore platform or subsea gas/oil exploration site.

Embodiments are described below with reference to the accompanying drawings. The invention is not limited to the described or illustrated embodiments.

Embodiments have been described with reference to different subject matters. For example, some embodiments have been described with reference to method embodiments, where other embodiments have been described with reference to apparatus embodiments. However, a person skilled in the art will gather from the above and the following description that, unless otherwise stated, in addition to any combination of features belonging to one type of subject matter, any combination between features relating to different subject matters (e.g., between features of the method type and features of the apparatus type) is considered as to be disclosed with this document.

BRIEF DESCRIPTION OF THE DRAWINGS

FIG. 1 illustrates one embodiment of a system 100 for transition of control between two controllers.

DETAILED DESCRIPTION

FIG. 1 shows one embodiment of a system 100 that includes a first controller 101, a second controller 103 and a communication system 105 for communicatively coupling the first controller 101 and the second controller 103.

The first controller 101 includes at least one first input terminal 107 (e.g., represented in FIG. 1 by five first input terminals 107), providing a first input signal 110. Further, the first controller 101 includes a first internal input port 109 again exemplarily represented by five input ports 109 corresponding to the five first input terminals 107. The first controller includes at least one first input OR-gate 111 that is arranged between the first input terminal 107 and the first internal input port 109.

For clarity, only one signal path between the first input terminal 107 and the first internal input port 109 is illustrated in FIG. 1, although each of the at least one first input terminal 107 includes such a signal transmission path to the control section 113 harboring the internal input ports 109. Further, between the first input terminal 107 and the first input OR-gate 111, a controllable first input block 113 is arranged.

The control section 113 of the first controller 101 includes at least one first output terminal 117 (e.g., represented by three internal output ports 117). There may be more or less internal output ports 117, and there may also be more or less internal input ports 109. The control section 113 outputs at the at least one first internal output port 117 an output signal 118 or a plurality of output signals 118 corresponding to the different internal output ports 117 that are derived based on the at least one input signal received at the at least one internal input port 109. The first output signal 118 supplied at the at least one first internal output port 117 is supplied via a first controllable output block 119, an OR-gate 121 to at least one first output terminal 123, where the number of first output terminals 123 corresponds to the number of first internal output ports 117.

The second controller 103 includes at least one second input terminal 125, where a number of the at least one second input terminal equals the number of the at least one first input terminal 107 of the first controller 101. The second controller 103 includes a second controllable input block 127 and a second input OR-gate 129 between the at least one second input terminal 125 and at least one second internal input port 131.

Further, the second controller 103 includes a control section 133 that derives a second output signal 136 provided at least one second internal output port 135 based on the at least one input signal received at the at least one internal input port 131. Via a second controllable output block 137 and a second output OR-gate 139, the second output signal is supplied to at least one second output terminal 141 of the second controller 103. For clarity, the second controllable input block 137 and the second input OR-gate 139 are illustrated for only one second input terminal 125. However, the other input terminals 141 include corresponding transmission lines. The same holds for the output path between the control section 133 and the at least one output terminal 141.

Via the communication system 105 including a communication bus including signal lines 143 at the input section and signal lines 145 at the output section, the input signals and output signals between the first controller 101 and the second controller 103 are mutually exchanged.

For example, an input signal supplied to the at least one first input terminal 107 of the first controller 101 is supplied (e.g., via the communication bus 143) to the at least one OR-gate 129 of the second controller 103 after having passed the controllable first input block 115. Similarly, the input signal supplied to the second input terminal 125 of the second controller 103 is supplied (e.g., via the communication bus 143) after having passed the second input block element 127 to the first input OR-gate 111 of the first controller 101. Thereby, exchange of the input signal between the two controllers 101, 103 is enabled.

Similarly, the first output signal 118 output at the internal first output terminal 117 is supplied after having passed the first controllable output block 119 to the second output OR-gate 139 of the second controller 103. Further, the second output signal 136 supplied or provided at the second internal output port 135 is supplied after having passed the second output controllable block element 137 to the first output OR-gate 121 of the first controller 101.

For example, the first internal output port 117 outputs a first output signal 118. Further, the second internal output port 135 provides a second output signal 136.

The system 100 illustrated in FIG. 1 is adapted to carry out one embodiment of a method for condition of control from the first controller 101 to the second controller 103.

In the beginning, the input lines 106 are all connected to the respective first input terminals 107 of the first controller 101, and the output lines 124 are all connected to the first output terminals 123 of the first controller. This is indicated by the solid line(s) of the input lines 106 and the output lines 124. For example, the input lines 106 may be connected to one or more sensors for sensing physical quantities, such as temperature, fume, humidity, gas, etc. Further, the output lines 124 may lead to one or more actuators for providing control signals to these actuators in order to operate these actuators in case of an emergency, such as a fire situation or a gas emission.

When the first controller 101 is to be replaced by the second controller 103, one of the output lines 124 may be disconnected from the first output terminal 123 and may then be connected to the first output terminal 141, as is indicated by the broken line 126. For example, one output line 124 after the other may be switched from the first controller 101 to the second controller 103. This may be performed, while none of the input lines 106 is connected to the input terminal or terminals 125 of the second controller 103. Thus, also in this case, the second controller 103 may be provided with essentially the same input signal(s) as the input signal(s) provided by the input lines 106 that are connected to the input terminals 107 of the first controller. This is achieved by the aforementioned exchange of input signals between the two controllers 101, 103.

The first output signal 118 derived by the control section 113 of the first controller 101 is supplied to the second output OR-gate 139 of the second controller 103 and is thereby used as an input of this OR-gate 139, where as an input, the second output signal 136 derived by the control section 133 of the second controller 103 is supplied to this second output OR-gate 139. The resulting signal 147 from the OR-gate 139 is thus derived as a logical "OR" of the signal 136 and the signal 118.

In a later stage of the method for transition of control from the first controller 101 to the second controller 103, the first output signal 118 output by the control section 113 of the first controller 101 may be blocked using the first controllable output block 119 so that the second output OR-gate 139 does not receive the first output signal 118 anymore but only receives the second output signal 136. Thereby, the output signal 147 eventually output at the second output terminal 141 is the second output signal 136 as output by the control section 133 of the second controller 103.

For example, during disconnecting the output line 124 from the first output terminal 123 and connecting the output line 124 to the second output terminal 141, the output of the first output signal 118 and/or the output of the second output signal 136 may be blocked using the blocking elements 119, 137, respectively. Later, the first output signal 118 and/or the second output signal 136 may not be blocked anymore by removing the blocking.

The input lines 106 initially connected to the respective first input terminals 107 of the first controller 101 may be switched to be connected to the second input terminals 125 of the second controller 103 one by one (e.g., analogously to the switching of the output lines 124), as schematically illustrated as the broken line 108.

The following table indicates the extent of adaptation of several components of the system 100 to be adapted for performing a method according to an embodiment:

TABLE

| Module | Change | Comment |
| --- | --- | --- |
| Input module | Reduction 2% | I/O module is normally improved. Diagnostics of input card and SIL of input card is improved. New safety are better than existing solutions with standard I/O modules |
| Bus to CPU | Reduction 1% | Bus from input card to CPU is normally improved due to use of new approved safety bus |
| New CPU | Addition 2% | New CPU comes in addition to existing CPU |
| Redundant bus to existing CPU, including redundant converter | Addition 1% | Bus link to existing controller is in addition to existing solution, but representing less than 1% of SIL2 budget |
| Existing CPU | No change | Same CPU as always used |
| Bus to output card | No change | Same Profibus as always used |
| Output card | No change | Same output card as always used |

The term "comprising" does not exclude other elements or steps, and "a" or "an" does not exclude a plurality. Also, elements described in association with different embodiments may be combined. Reference signs in the claims should not be construed as limiting the scope of the claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for transition of control from a first controller to a second controller, the method comprising:
   communicatively coupling the first controller and the second controller, such that at least one static digital input signal received by one controller of the first controller and the second controller is mutually provided to the respective other controller of the first controller and the second controller, and such that at least one static digital output signal generated by the one controller of the first controller and the second controller is mutually provided to the respective other controller of the first controller and the second controller;
   disconnecting at least one output line from the first controller;
   connecting the at least one output line to the second controller;
   supplying at least one output signal to the at least one output line, wherein the at least one output signal is obtained by performing a logical OR to at least one first output signal generated by the first controller and at least one second output signal generated by the second controller; and
   before disconnecting the at least one output line from the first controller, supplying a logical high signal to the at least one output line by an external voltage source when the at least one first output signal is a logical high signal or when the at least one output line is at a logical high state during normal operation.

2. The method of claim 1, further comprising:
   blocking output of the at least one first output signal, blocking output of the at least one second output signal, or a combination thereof.

3. The method of claim 2, further comprising removing blocking of the output of the at least one second output signal, removing blocking of the output of the at least one first output signal, or a combination thereof after the connecting of the at least one output line to the second controller.

4. The method of claim 1, wherein the connecting of the at least one output line to the second controller comprises connecting the at least one output line to at least one second output terminal of the second controller, and
   wherein the method further comprises monitoring whether the connection of the at least one output line to at least one second output terminal of the second controller is correct.

5. The method of claim 1, wherein connections of all output lines of the at least one output line are switched one by one from the first controller to the second controller.

6. The method of claim 1, further comprising:
   disconnecting at least one input line from the first controller;
   connecting the at least one input line to the second controller; and
   supplying the at least one static digital input signal, which is carried by the at least one input line, to the first controller.

7. The method of claim 6, further comprising blocking the input signal at the first controller, blocking the input signal at the second controller, or a combination thereof.

8. The method of claim 7, further comprising removing the blocking of the input signal at the first controller, removing the blocking of the input signal at the second controller, or a combination thereof.

9. The method of claim 6, wherein the connecting of the at least one input line to the second controller comprises connecting the at least one input line to at least one second input terminal of the second controller, and
   wherein the method further comprises monitoring whether the connection of the at least one input line to the at least one second input terminal of the second controller is correct.

10. A system for transition of control between two controllers, the system comprising:
    a first controller comprising:
       at least one first input terminal;
       at least one first internal input port;
       at least one first input OR-gate between the at least one first input terminal and the at least one first internal input port;
       at least one first output terminal;
       at least one first internal output port;
       at least one first output OR-gate between the at least one first internal output port and the at least one first output terminal;
    a second controller comprising:
       at least one second input terminal;
       at least one second internal input port;
       at least one second input OR-gate between the at least one second input terminal and the at least one second internal input port;
       at least one second output terminal;
       at least one second internal output port;
       at least one second output OR-gate between the at least one second internal output port and the at least one second output terminal; and
    a communication system for communicatively coupling the first controller and the second controller, such that an input signal received at the at least one second input terminal of the second controller is supplied to the at least one first input OR-gate, a second output signal generated at the at least one second internal output port of the second controller is supplied to the at least one first output OR-gate, an input signal received at the at least one first input terminal of the first controller is supplied to the at least one second input OR-gate, and a first output signal generated at the at least one first internal output port of the first controller is supplied to the at least one second output OR-gate.

11. The system of claim 10, further comprising:
    at least one first controllable input block arranged between the at least one first input terminal and the at least one first input OR-gate for blocking an input signal received at the at least one first input terminal;
    at least one first controllable output block arranged between the at least one first internal output port and the at least one first output OR-gate for blocking an output signal generated at the at least one first internal output port;
    at least one second controllable input block arranged between the at least one second input terminal and the at least one second input OR-gate for blocking an input signal received at the at least one second input terminal; and
    at least one second controllable output block arranged between the at least one second internal output port and the at least one second output OR-gate for blocking an output signal generated at the at least one second internal output port.

12. The system of claim 10, wherein the communication system is implemented in software loaded into the first controller and the second controller.

13. The system of claim 10, wherein the system is adapted as a protection system for controlling actuators for operation of gas, fire, or gas and fire emergency equipment.

14. The method of claim 1, wherein the at least one output signal is obtained by performing a logical OR using an OR-gate.

15. The method of claim 2, wherein blocking the output of the at least one first output signal, blocking the output of the at least one second output signal, or the combination thereof comprises blocking the output of the at least one first output signal, blocking the output of the at least one second output signal, or the combination thereof before the disconnecting of the at least one output line from the first controller.

16. The method of claim 7, wherein blocking the input signal at the first controller, blocking the input signal at the second controller, or the combination thereof comprises blocking the input signal at the first controller, blocking the input signal at the second controller, or the combination thereof before the disconnecting of the at least one input line from the first controller.

17. The method of claim 8, wherein removing the blocking of the input signal at the first controller, removing the blocking of the input signal at the second controller, or the combination thereof comprises removing the blocking of the input signal at the first controller, removing the blocking of the input signal at the second controller, or the combination thereof after the connecting of the at least one input line to the second controller.

* * * * *